United States Patent [19]
Walsh et al.

[11] Patent Number: 6,042,870
[45] Date of Patent: Mar. 28, 2000

[54] PROCESS FOR PREPARING FROZEN PAR-FRIED POTATO STRIPS HAVING DEEP FRIED TEXTURE WHEN OVEN-FINISHED

[75] Inventors: Belle Cromwell Walsh, Cincinnati; Jeffrey John Kester, West Chester; Patrick Joseph Corrigan; Joseph James Elsen, both of Cincinnati, all of Ohio

[73] Assignee: The Procter & Gamble Company, Cincinnati, Ohio

[21] Appl. No.: 08/968,846

[22] Filed: Nov. 5, 1997

Related U.S. Application Data

[63] Continuation of application No. 08/639,820, Apr. 29, 1996, abandoned.

[51] Int. Cl.[7] .................................................. A23L 1/217
[52] U.S. Cl. ................................... 426/637; 426/441
[58] Field of Search ............................ 426/438, 441, 426/637

[56] References Cited

U.S. PATENT DOCUMENTS

| | | |
|---|---|---|
| 2,831,854 | 4/1958 | Tucker . |
| 2,962,419 | 11/1960 | Minich . |
| 3,397,993 | 8/1968 | Strong . |
| 3,600,186 | 8/1971 | Mattson . |
| 3,865,964 | 2/1975 | Kellermeier ......................... 426/307 |
| 3,932,532 | 1/1976 | Hunter . |
| 3,934,046 | 1/1976 | Weaver et al. ..................... 426/637 X |
| 3,963,699 | 6/1976 | Rizzi . |
| 4,005,195 | 1/1977 | Jandacek . |
| 4,109,012 | 8/1978 | Bates ................................... 426/302 |
| 4,109,020 | 8/1978 | Gorfien ............................... 426/241 |
| 4,219,575 | 8/1980 | Saunders ............................ 426/242 |
| 4,325,295 | 4/1982 | Caridis ................................. 99/339 |
| 4,456,624 | 6/1984 | Glantz .................................. 426/96 |
| 4,508,746 | 4/1985 | Hamm ................................. 426/601 |
| 4,517,360 | 5/1985 | Volpenhein ......................... 536/119 |
| 4,518,772 | 5/1985 | Volpenhein ......................... 536/119 |
| 4,542,030 | 9/1985 | Haury ................................. 426/262 |
| 4,551,340 | 11/1985 | El-Hag ................................ 426/437 |
| 4,579,743 | 4/1986 | Hullah ................................ 426/262 |
| 4,582,927 | 4/1986 | Fulcher ............................... 560/201 |
| 4,590,080 | 5/1986 | Pinegar .............................. 426/441 |
| 4,840,815 | 6/1989 | Meyer ................................. 426/611 |
| 4,861,613 | 8/1989 | White ................................. 426/611 |
| 4,888,195 | 12/1989 | Huhn .................................. 426/601 |
| 4,888,196 | 12/1989 | Ehrman .............................. 426/601 |
| 4,900,576 | 2/1990 | Bonnett .............................. 426/438 |
| 4,931,296 | 6/1990 | Shanbhag ........................... 426/243 |
| 5,000,970 | 3/1991 | Shanbhag ........................... 426/296 |
| 5,104,678 | 4/1992 | Yang .................................. 426/601 |
| 5,242,699 | 9/1993 | Bednar ............................... 426/302 |
| 5,279,840 | 1/1994 | Baisier ............................... 426/102 |
| 5,288,512 | 2/1994 | Seiden ................................ 426/607 |
| 5,302,410 | 4/1994 | Calder ................................ 426/637 |
| 5,308,640 | 5/1994 | Baer ................................... 426/611 |
| 5,648,110 | 7/1997 | Wu ..................................... 426/102 |

FOREIGN PATENT DOCUMENTS

| | | |
|---|---|---|
| 0 026 565 | 1/1980 | European Pat. Off. . |
| 0 342 059 | 12/1989 | European Pat. Off. . |
| 2.215.902 | 1/1974 | France . |
| 27 13935 | 3/1977 | Germany . |
| 38 14587 | 4/1988 | Germany . |
| 2 078 081 | 1/1981 | United Kingdom . |
| WO 91/00023 | 1/1991 | WIPO . |
| WO 91/15964 | 10/1991 | WIPO .............................. A23D 9/00 |
| WO 94/05165 | 3/1994 | WIPO . |

OTHER PUBLICATIONS

"Flavored Vegetable Oils as a Substitute for Beef Tallow in Deep Frying Applications", *Food Technology*, pp. 90–94 (1989).

Peters, J.C. et al., *Journal of the American College of Toxicology*, vol. 10, No. 3, 1991, pp. 357–367.

*Primary Examiner*—Arthur L. Corbin
*Attorney, Agent, or Firm*—J. A. Krebs; K. F. Clark; K. L. McDowDunham

[57] ABSTRACT

The present invention relates to frozen hydrated par-fried potato strips comprising about 35% to about 55% moisture which when oven finished have substantially the same internal and surface texture as deep fried French fries. More particularly this invention relates to par-fried potato strips for subsequent finishing in an oven prior to consumption prepared by: (a) parfrying potato strips at an oil temperature of from about 270° F. (132° C.) to about 385° F. (196° C.) for a time sufficient to reduce the moisture content of the par-fries to from about 30% to about 50%, (b) hydrating the surface of said par-fries until the weight thereof is increased by from about 1% to about 12%, and (c) freezing said hydrated par-fries. The frozen, hydrated par-fries comprise from about 35% to about 55% moisture.

17 Claims, No Drawings

PROCESS FOR PREPARING FROZEN PAR-FRIED POTATO STRIPS HAVING DEEP FRIED TEXTURE WHEN OVEN-FINISHED

This is a continuation of application Ser. No. 08/639,820, filed on Apr. 29, 1996, now abandoned.

BACKGROUND OF THE INVENTION

The present invention relates to frozen par-fried potato strips comprising about 35% to about 55% moisture which when oven finished have substantially the same internal and surface texture as deep fried French fries. More particularly this invention relates to par-fried potato strips for subsequent finishing in an oven prior to consumption. The oven finished fries show a vast improvement in texture when compared to commercially prepared par-fries that have been oven finished.

French fries are one of the most popular convenience foods. A wide variety of French fried potato products are produced for both foodservice and home use. French fried potato strips, commonly referred to as "French fries" are served in most fast food restaurants. Most restaurants including large restaurants and consumers prefer to prepare the French fries from the frozen or chilled partially fried product (hereinafter par-fried) rather than go through the procedure of preparing French fries from raw potatoes. The par-fried potatoes are converted by the fast food restaurant or consumer into products such as French fried potatoes and the like.

The use of par-fried potato strips has been widely adopted in fast food restaurants because of the advantages they offer. A few of the recognized advantages associated with the use of frozen par-fried potato strips are, for example, users know the exact cost, the number of servings and the cost per portion. In addition, use of the frozen par-fried potatoes simplifies storage and inventory control, assures uniform quality from one season to another and reduces labor and time preparation for serving.

A major problem confronted by fast food restaurants is obtaining oven finished fries which have the taste and texture of fries finished by frying in hot oil. Important features of French fries finished by deep frying are interior moistness and crispness of the crust. However heretofore, achieving these product characteristics generally has not been possible when the products are oven finished. The oven finished products are typically leathery, tough, drier and less lubricious than French fries finished by frying in hot oil or they tend to be limp and soggy and do not have a crisp crust. These problems are recognized by the consumer and, more particularly, by fast food restaurant operators. As a result fast food restaurants seldom practice/use oven finishing techniques for preparing French fries.

Suppliers of frozen par-fried potato strips have proposed a number of solutions for improving the crispness of French fries which have been finished in an oven. For example, the surface treatment of potato strips with firming agents such as modified starches, gums, alginates, calcium salts, and the like. The majority of the methods for producing "finished baked fries" require coating the par-fried potato strip, see for example U.S. Pat. No. 3,865,964 (Kellermeir et al.), U.S. Pat. No. 5,000,970 and U.S. Pat. No. 4,913,296 (Shanbhag et al.), U.S. Pat. No. 5,279,840 (Baiser et al.) and U.S. Pat. No. 5,302,410 (Calder et al.).

The results obtained by surface treatment procedures, however, have been successful only to a limited degree. These processes may provide limited improvements in texture, however they do not provide frozen par-fried potato strips which, when oven-finished, have substantially the same texture as deep fried potato strips.

While not wishing to be bound by theory, it is believed that prior art oven fries lack the desirable surface crispness associated with high-quality deep-fried French fries in part because the oven fries are par-fried to relatively high moisture contents (e.g. $\geq 50\%$ bulk moisture) prior to freezing. The limited amount of frying to yield a relatively high-moisture parfry results, upon oven finishing, in an oven fry that lacks a crust structure typical of deep-fried French fries. One approach for producing a crust in an oven fry that more closely simulates that of deep-fried French fries is to parfry the potato strips more extensively to a lower moisture content (e.g. $\leq 50\%$ bulk moisture) so as to more fully develop the crust structure and thickness. While this approach may yield improved surface crispness upon oven finishing of the parfries, it also results in a significant driving force for moisture migration during frozen storage. The thicker, more developed low-moisture crust region of the resulting parfry has a relatively low water activity (Aw) and will, therefore, tend to act as a sink for the movement of water vapor away from the internal core of the parfry during frozen storage. Consequently, there is a potential that with an extended time of frozen storage (and/or fluctuating temperatures) the internal core of the fry will be dehydrated to such an extent that the oven-finished French fry will be perceived as having an unacceptably dry interior.

The present invention enables the production of par-fried potato strips that, upon oven-finishing, yield deep fried internal and surface textural properties. One aspect of the present invention is based in part on the surprising discovery that oven finished French fries that have substantially the same internal and surface texture as deep fried French Fries can be produced by reducing the amount of moisture transfer that occurs between the high-moisture internal starch matrix and the low-moisture crust region during frozen storage. This reduction in moisture transfer is accomplished by hydrating the outer surface of par-fried potato strips prior to frozen storage. As a result of this surface hydration step, parfried potato strips can be produced that have been fried more extensively to lower moisture contents (i.e. $\leq 50\%$ moisture) to more fully develop the crust structure, and yet which are not subject to significant water movement from the fry interior to the crust region during frozen storage. The surface hydration step effectively increases the water activity of the outer crust region, thereby, greatly reducing or eliminating the water activity differential between the fry interior and crust region that is the driving force for moisture migration. Upon oven finishing, these hydrated parfries have a surface texture more like deepfried French fries because they have been parfried more extensively to develop the crust structure. In addition, the oven-finished fries have a desirable moist interior because the surface hydration step has minimized dehydration of the core during frozen storage. Net, the oven-finished French fries of the present invention possess both internal and surface textural attributes that closely simulate deep-fried French fries.

Another aspect of the present invention is based on the fact that the par-fries produced by the process disclosed herein, can be oven finished in substantially less time than commercially prepared fries intended for oven finishing.

Accordingly, it is an object of the present invention to provide a French fried product which when finish baked, closely resembles the internal and surface texture of deep fried fast food French Fries.

It is another object of the present invention to provide a par-fried frozen product which requires only a brief period of cooking before serving.

It is further an object of the present invention to provide a par-fried frozen product which can be finished in an oven of a fast food restaurant or in the consumer's home which is virtually indistinguishable from deep fried French fried potatoes.

SUMMARY OF THE INVENTION

The present invention is a process for preparing par-fried potato strips which, when oven finished, have substantially the same crispness and internal textural attributes of French fried potatoes that have been finished by deep frying. The process comprises the steps of:

(a) parfrying potato strips at an oil temperature of from about 270° F. (132° C.) to about 385° F. (196° C.) for a time sufficient to reduce the moisture content of the par-fries to from about 30% to about 50%;

(b) hydrating the surface of said par-fries by application of water or an aqueous solution or dispersion until the weight thereof is increased by from about 1% to about 12%; and (c) freezing said hydrated par-fries; said frozen hydrated par-fries having a bulk moisture of from about 35% to about 55% moisture.

DETAILED DESCRIPTION

The present invention relates to a process for preparing frozen par-fried potato strips.

As used herein the terms "par-fry" or "par-fried potato strips" refer to potato strips that have been subjected to at least one frying process (e.g., deep frying) but which have not been completely cooked.

As used herein "cooked" refers to a procedure wherein food products are treated with heat prior to their consumption, such as, for example, by frying, baking, broiling, microwaving, heating in a toaster or toaster oven, etc. Typically, cooking entails reducing the moisture content of the food.

As used herein the term "fat" or "oil" refers to edible fatty substances in a general sense, including natural or synthetic fats and oils consisting essentially of triglycerides, such as, for example soybean oil, corn oil, cottonseed oil, canola oil, sunflower oil, palm oil, coconut oil, fish oil, lard and tallow, which may have been partially or completely hydrogenated or modified otherwise, as well as non-toxic fatty materials having properties similar to triglycerides, herein referred to as fat-substitutes, which materials may be partially or fully indigestible. The terms "fat" and "oil" are used interchangeably.

As used herein the term "conditioned oil" refers to oil which has been previously used for frying for such a time that it has developed fried flavor.

As used herein the term "finished" refers to a product that has been subjected to a cooking process (e.g., frying, microwaving, oven baking) to convert it to a ready-to-eat form.

As used herein the term "oven finished" refers to a product that has been subjected to an oven baking process to convert it to a ready-to-eat form. Obviously, the advantages of the invention cannot be realized until the par-fry is cooked, as by baking in an oven such as a forced air convection oven, a hot air impingement oven, a combination of infrared radiation and convection oven, a combined microwave and convection oven, a toaster or toaster oven or a conventional home oven.

Unless otherwise stated, all percentages, ratios or proportion expressed herein are by weight.

In accordance with the present invention, raw unpeeled white potatoes are obtained for processing. Any variety of potatoes is acceptable, for instance Garnet Chili, Early Rose, Russet Rural, Peach Blow, Early Ohio, Triumph, Kennebec, Merrimack, Delus, Saco, Katahdin, Bounty, Cherokee, Chippewa, Early Gem, Haig, Irish Cobbler, La Rough, Norgold Russet, Norland, Onaway, Pungo, Re La Sorda, Red McGlure, Red Pontiac, Russet Burbank, Russet Sebago, Sebago Superior, Shepody, Viking or White Rose. However, it is preferred to use Russet Burbank or Katahdin potatoes in the practice of this invention to obtain the best combination of internal texture and flavor in the final French fry product. It should be noted that the quality of French fries will vary with the potato used. This variance will occur both between different species of potatoes and the age of the potato within a given species.

The potatoes are washed, peeled, trimmed, sorted, and are cut into strips of a desired size and shape customarily used for French fries. Potatoes may be cut into spiral cut, crinkle-cut and straight cut strips such as shoestring potato strips and thick strips.

In the practice of the present invention it is preferred that the potato strips known in the art as "shoestrings" be used herein. Shoestring potato strips, as used herein refer to potato strips that are from about 3/16 to about 5/16 inch square in cross-section and from about 2.5 to about 5 inches in length.

Other potato strips which may be used herein are known in the art as "crinkle cut" strips. Such strips usually average from about 5/16 to about ½ inch in cross-section and from about 2 to about 4 inches in length.

Also, straight cut thick potato strips (known as "regular-cut") of from about 5/16 to about ½ inch square in cross-section and about 2.5 to about 5 inches in length may be used. Larger potato strips of the type referred to as "steak fries" may also be used. Typically, these potato strips have a rectangular cross-section of about ½ inch by about 7/8 inch. After cutting, the strips may be washed to remove surface starch.

Potato Processing

The potato strips are blanched according to conventional procedures known in the arts This is done to inactivate enzymes and remove excess free sugars from the surfaces of the cut strips. Typically the strips are blanched by immersion in hot water at a temperature of about 140° F. (60° C.) to about 200° F. (93.3° C.) for about 3–20 minutes depending upon strip size. Alternatively, the strips may be blanched in steam, at atmospheric pressure for about 2 to about 10 minutes.

Following the blanching step, the potato strips may be treated according to conventional methods known in the art. For instance, the potato strips may be subjected to additional water immersion steps to further leach excess sugars or the strips may be treated with sodium acid pyrophosphate (SAPP), a chelating agent used to prevent discoloration of the strips. Dextrose (corn sugar) may also be applied to the surface of the strips in order to yield a desired level of brown color development during subsequent processing. Other treatments known in the art may also be used.

After blanching and the optional treatments described above, the potato strips are drained and optionally dehydrated to reduce their moisture content. During dehydration of the strips the moisture content is typically reduced to a point at which the strips have lost from about 10% to about 30% of their initial weight, preferably about 15% to about 20% of their initial weight. Any of the conventional drying procedures used in the production of par-fried potato strips may be used, such as, for example, subjecting the potato strips to heated air at temperatures of from about 150° F. (65.6° C.) to about 350° F. (176.7° C.) for from about 5 to about 20 minutes potato strips may be dehydrated by heating in a forced air convection oven or an impingement oven. microwave or radio-frequency drying may also be used.

The potato strips are next fried in edible oil at a temperature of from about 270° F. (132° C.) to about 385° F. (196° C.), for a time sufficient to reduce the moisture content of the potato strips to a moisture of from about 30% to about 50%, preferably to a moisture of from about 32% to about 46% and more preferably to a moisture of from about 34% to about 42%. Any variety of edible fats and oils may be used to par-fry the potato strips. The par-frying may be accomplished in a single fry process, or in a two fry process wherein the potato strips may be cooled, chilled or frozen before entering the second par-fryer. Cooling, chilling or freezing is conducted by any suitable method known in the art to reduce the temperature of the potato strips. Other frying techniques may also be used, such as heated oil spray which surrounds the potato strip with hot oil or frying using an oil foam.

Optionally, the par-fries of the present invention may be prepared using commercially available par-fries. Therefore, when using commercially available par-fried potato strips it is critical that the moisture content of the par-fries have been reduced to a final moisture content of from about 30% to about 50% before hydrating the crust.

After parfrying, the parfried potato strips may be hydrated immediately or they may be cooled, chilled, or frozen prior to hydration. Chilling or freezing of the parfries can be accomplished by methods known in the art. For example, the parfries can be subjected to a blast of cold air at a temperature of less than about −20° F. (−28.9° C.), or the parfries can be immersed in or sprayed with a liquid refrigerant such as liquid nitrogen. Any conventional freezing process can be used. It is preferred that the parfries be frozen quickly, i.e., in less than 20 minutes, preferably in less than 5 minutes, after completion of the parfrying.

A preferred method for preparing the parfried potato strips described herein comprises peeling, trimming, and cutting raw potatoes into strips, blanching, and reducing the moisture of the potato strips to not less than about 60% via either oven drying or parfrying. The potato strips are then immersed in oil at a temperature of from about 270° F. (132.2° C.) to about 335° F. (168.3° C.) for a time sufficient to further reduce the moisture of the strips to a final moisture content of from about 30% to about 50%, preferably from about 32% to about 46%, and more preferably from about 34% to about 42%. The parfried potato strips may then be hydrated immediately or they may be cooled, chilled, or frozen prior to hydration. Chilling or freezing of the parfries can be accomplished by methods known in the art.

Edible Oils

A variety of edible fats and oils may be used to coat the surface and to fry the par-fried potato strips. Edible fats and oils suitable for use include but are not limited to beef tallow, lard, cottonseed oil, canola, soybean oil, corn oil, palm oil, fish oil, safflower oil, sunflower oil, coconut oil, peanut oil, medium chain triglycerides, structured triglycerides containing a combination of short or medium chain fatty acids and long chain fatty acids (e.g. Caprenin) and the like or combinations thereof. If desired the oils may be conditioned or flavored, see *Flavored Vegetable Oils as a Substitute for Beef Tallow in Deep Frying Applications*, Food Technology, pp 90–94 (1989) and U.S. Pat. No. 5,104,678 (Yang et al.)

The edible oils used for frying the par-fried potato strips include natural or synthetic fats and oils. The oils may be partially or completely hydrogenated or modified otherwise. Additionally non-toxic, fatty materials having properties similar to triglycerides such as sucrose polyesters and Olean™, from the Procter and Gamble Company, and reduced calorie fats, polyol fatty acid polyesters, and diversely esterified polyol polyesters or combinations of regular fats and fat substitutes may also be used herein. Preferably the edible fat or oil used in par-frying the potato strips has a free fatty acid level no greater than about 0.08%.

One reduced calorie fat that has been found to be useful comprises a fairly high level (e.g., at least about 85%) of combined MML and MLM triglycerides, where M is typically a mixture of $C_8$–$C_{10}$ saturated fatty acids and L is predominantly behenic acid, but can be $C_{20}$–$C_{24}$. See U.S. Pat. No. 4,888,196 to Ehrman et al., issued Dec. 9, 1989 and U.S. Pat. No. 5,288,512 issued to Seiden, Feb. 22, 1994 for the synthesis and more detailed description of these reduced calorie fats.

The MML, LLM, triglycerides are further characterized by having a fatty acid composition which comprises from about 35% to about 60% combined $C_8$–$C_{10}$ saturated fatty acids, a ratio of $C_8$–$C_{10}$ saturated fatty acids of from about 1:5 to about 25:1, and from about 35% to about 60% behenic fatty acid.

"MML", "LLM", "LML" and "MLM" are standard representations of a triglyceride. For example, MML has a long chain saturated acid residue (L) in the #1 or #3 position (an end position) with two medium chain saturated fatty acid residues in the remaining two positions.

By "reduced calorie" as used herein is meant fats that provide an at least about 10%, and preferably an at least about 30%, reduction in calories relative to corn oil. The reduction in calories provided by these reduced calorie fats can be determined by studies similar to that described by Peters, J. C. et al., *Journal of the American College of Toxicology*, Vol. 10, No. 3, 1991, pp.357–367.

By "polyol" is meant a polyhydric alcohol containing at least 4, preferably from 4 to 11 hydroxyl groups. Polyols include sugars (i.e., monosaccharides, disaccharides, and trisaccharides), sugar alcohols, other sugar derivatives (i.e. alkyl glucosides). polyglycerols such as diglycerol and triglycerol, pentaerythritol and polyvinyl alcohols. Specific examples of suitable sugars, sugar alcohols and sugar derivatives include xylose, arabinose, ribose, xylitol, erythritol, glucose, methyl glucoside, mannose, galactose, fructose, sorbitol, maltose, lactose, sucrose, raffinose, and maltotriose.

By "polyol fatty acid polyester" is meant a polyol having at least 4 fatty acid ester groups. Polyol fatty acid esters that contain 3 or less fatty acid ester groups are generally digested in, and the products of digestion are absorbed from, the intestinal tract much in the manner of ordinary triglyceride fats or oils, whereas those polyol fatty acid esters containing 4 or more fatty acid ester groups are substantially non-digeslible and consequently non-absorbable by the human body. It is not necessary that all of the hydroxyl groups of the polyol be esterified, but it is preferable that disaccharide molecules contain no more than 3 unesterified hydroxyl groups for the purpose of being non-digestible. Typically, substantially all, e.g., at least about 85%, of the hydroxyl groups of the polyol are esterified. In the case of sucrose polyesters, typically from about 7 to 8 of the hydroxyl groups of the polyol are esterified.

The polyol fatty acid esters typically contain fatty acid radicals typically having at least 4 carbon atoms and up to 26 carbon atoms. These fatty acid radicals can be derived from naturally occurring or synthetic fatty acids. The fatty acid radicals can be saturated or unsaturated, including positional or geometric isomers, e.g., cis- or trans-isomers, and can be the same for all ester groups, or can be mixtures of different fatty acids.

Liquid non-digestible oils have a complete melting point below about 37° C. include liquid polyol fatty acid polyesters (see Jandacek; U.S. Pat. No. 4,005,195; Issued Jan. 25, 1977); liquid esters of tricarballylic acids (see Hamm; U.S. Pat. No. 4,508,746; Issued Apr. 2, 1985); liquid diesters of dicarboxylic acids such as derivatives of malonic and succinic acid (see Fulcher; U.S. Pat. No. 4,582,927; Issued Apr. 15, 1986); liquid triglycerides of alpha-branched chain carboxylic acids (see Whyte; U.S. Pat. No. 3,579,548; Issued May 18, 1971); liquid ethers and ether esters containing the neopentyl moiety (see Minich; U.S. Pat. No. 2,962,419; Issued Nov. 29, 1960); liquid fatty polyethers of polyglycerol (See Hunter et al; U.S. Pat. No. 3,932,532; Issued Jan. 13, 1976); liquid alkyl glycoside fatty acid polyesters (see Meyer et al; U.S. Pat. No. 4,840,815; Issued Jun. 20, 1989); liquid polyesters of two ether linked hydroxypolycarboxylic acids (e.g., citric or isocitric acid) (see Huhn et al; U.S. Pat. No. 4,888,195; Issued Dec. 19, 1988); liquid esters of epoxide-extended polyols (see White et al; U.S. Pat. No. 4,861,613; Issued Aug. 29, 1989); all of which are incorporated herein by reference, as well as liquid polydimethyl siloxanes (e.g., Fluid Silicones available from Dow Corning).

The polyol fatty acid polyesters that are liquid have minimal or no solids at a temperature of 98.6° F. (37° C.), i.e., body temperatures. These liquid polyol polyesters typically contain fatty acid ester groups having a high proportion of $C_{12}$ or lower fatty acid groups or else a high proportion of $C_{18}$ or higher unsaturated fatty acid groups. In the case of those liquid polyol polyesters having high proportions of unsaturated $C_{18}$ or higher fatty acid groups, at least about half of the fatty acids incorporated into the polyester molecule are typically unsaturated.

The liquid polyol fatty acid polyesters can be prepared by a variety of methods known to those skilled in the art. These methods include: transesterification of the polyol (i.e. sugar or sugar alcohol) with methyl, ethyl or glycerol fatty acid esters using a variety of catalysts; acylation of the polyol with a fatty acid chloride; acylation of the polyol with a fatty acid anhydride; and acylation of the polyol with a fatly acid, per se. See, for example, U.S. Pat. Nos. 2,831,854, 3,600, 186, 3,963,699, 4,517,360 and 4,518,772, all of which are incorporated by reference, which disclose suitable methods for preparing polyol fatty acid polyesters. Specific, but non-limiting, examples of the preparation of liquid polyol polyesters suitable for use in the practice of the present invention are disclosed in Young et al: World Patent Application US91-02394 (publication number WO91-15964); published Oct. 31, 1991, which is incorporated by reference. The liquid polyol polyesters can contain behenic acid.

Polyol fatty acid polyesters that are solid at temperatures of about 37° C. and higher have the ability to bind high levels of edible liquid non-digestible oils, such as liquid polyol polyesters previously described, when included in appropriate amounts. This capacity to bind liquid non-digestible oils enables these solid polyol polyesters to control or prevent the passive oil loss problem associated with the ingestion of such liquid oils.

Diversely Esterified Polyol Polyesters

One preferred class of suitable solid polyol polyesters for use in the liquid/solid blend are those wherein the esters groups comprise a combination of (a) $C_{12}$ or higher unsaturated fatty acid radicals, $C_4$–$C_{12}$ fatty acid radicals or mixtures thereof, and (b) at least about 15% $C_{20}$ or higher saturated fatty acid radicals, preferably at least about 30%, more preferably at least about 50%, most preferably at least about 80%, long chain saturated fatty acid radicals.

Suitable unsaturated fatty acid radicals contain at least 12, preferably from 12 to 26, more preferably from 18 to 22, most preferably 18, carbon atoms. Suitable short chain saturated fatty acid radicals contain from 4 to 12, preferably from 6 to 12, and most preferably from 8 to 12, carbon atoms. Suitable long chain saturated fatty acid radicals contain at least 20, preferably from 20 to 26, most preferably 22, carbon atoms. The long chain unsaturated fatty acid radicals can be used singly or in mixtures with each other, in all proportions, as is also the case with the short chain and long chain saturated fatty acid radicals. In addition, straight chain (i.e. normal) fatty acid radicals are typical for the short chain and long chain saturated fatty acid radicals, as well as the long chain unsaturated fatty acid radicals. Examples of suitable long chain unsaturated fatty acid radicals for use in these solid polyol polyesters are monounsatirated radicals such as lauroleate, myristoleate, palmitoleate, oleate, elaidate, and erucate, and polyunsaturated radicals such as linoleate, arachidonate, linoleate, eicosapentaenoate, and docosahexaenoate. In terms of oxidative stability, the monounsaturated and diunsaturated fatty acid radicals are preferred. Examples of suitable short chain saturated fatty acid radicals are acetate, butyrate, hexanoate (caproate), octanoate (caprylate), decanoate (caprate), and dodecanoate (laurate). Examples of suitable long chain saturated fatty acid radicals are eicosanoate (arachidate), docosanoate (behenate), tetracosanoate (lignocerate), and hexacosanoate (cerotate).

Mixed fatty acid radicals from oils which contain substantial amounts of the desired long chain unsaturated fatty acids, short chain saturated fatty acids, or long chain saturated fatty acids can be used as sources of fatty acid radicals in preparing the solid polyol polyesters useful in the liquid/solid blend type of non-digestible fat component. The mixed fatty acids from such oils should preferably contain at least about 30% (more preferably at least about 50%, most preferably at least about 80%) of the desired long chain unsaturated, short chain saturated or long chain saturated fatty acids. For example, palm kernel oil fatty acids can be used instead of a mixture of the respective pure saturated fatty acids having from 8 to 12 carbon atoms. Similarly, rapeseed oil fatty acids or soybean oil fatty acids can be used instead of a mixture of the respective pure monounsaturated and polyunsaturated fatty acids having 12 to 26 carbon atoms, and hardened (i.e., hydrogenated) high erucic rapeseed oil fatty acids can be used in place of a mixture of the respective pure long chain saturated fatty acids having from 20 to 26 carbon atoms. Preferably, the $C_{20}$ or higher saturated fatty acids (or their derivatives, e.g. methyl esters) are concentrated, for example, by distillation. An example of source oils for these solid polyol polyesters are high oleic sunflower oil and substantially completely hydrogenated high erucic rapeseed oil. When sucrose is substantially completely esterified with a 1:3 by weight blend of the methyl esters of these two oils, the resulting polyester has a molar ratio of unsaturated $C_{18}$ acid radicals to saturated $C_{20}$ or higher acid radicals of about 1:1, the saturated $C_{20}$ and $C_{22}$ acid radicals being about 28.6% of the total fatty acid radicals. The higher the proportion of the desired long chain unsaturated/short chain saturated and long chain saturated fatty acids in the source oils used in making the solid polyol polyesters, the more efficient the polyesters will be in their ability to bind the liquid non-digestible oils.

The molar ratio of (a) long chain unsaturated fatty acid radicals or short chain fatty acid radicals or mixtures thereof, to (b) long chain saturated fatty acid radicals, is from about 1:15 to about 1:1. Preferably, this molar ratio of (a) to (b) radicals is from about 1:7 to about 4:4, most preferably from about 1:7 to about 3:5.

Examples of solid polyol fatty acid polyesters containing mixtures of (a) and (b) radicals include sucrose tetrabehenate tetracaprylate, sucrose pentabehenate trilaurate, sucrose hexabehenate dicaprylate, sucrose hexabehenate dilaurate, the sorbitol hexaester of palmitoleic and arachidic fatty acid radicals in a 1:2 molar ratio, the raffinose octaester of linoleic and behenic fatty acid radicals in a 1:3 molar ratio, the maltose heptaester of a mixture of sunflower oil and lignoceric fatty acid radicals in a 3:4 molar ratio, the sucrose octaester of oleic and behenic fatty acid radicals in a 2:6 molar ratio, the sucrose octaester of lauric, linoleic and behenic fatty acid radicals in a 1:3:4 molar ratio, and the sucrose hepta- and octaesters of $C_{18}$ mono- and/or di-unsaturated fatty acid radicals and behenic fatty acid radicals in a molar ratio of unsaturated:behenic acid radicals of about 1:7 to 3:5.

Surface Hydration

The surface of the par-fried potato strips comprising about 30% to about 50% moisture are hydrated. The hydration step improves the texture of the final oven-finished French fry and reduces the amount of water migration from the core of the parfry to the crust region during frozen storage.

Hydration of the crust may be carried out by various methods known in the art such as a curtain spray of water or aqueous solution or dispersion, contact with a moist vapor, or a rapid immersion or dip of the parfries into a pool of water or aqueous solution or dispersion. Application of water by atomized sprays is the most effective way to achieve a uniform distribution of the relatively small amounts of water effective for the purposes of the present invention.

Hydration of the surface crust region may occur immediately after parfrying or the parfried potato strips may be cooled, chilled, or frozen prior to hydration. From about 1% to about 12% (by weight of the parfries) of water or aqueous solution or dispersion is applied to the surface of the parfries during the hydration step. Preferably about 2% to about 10%, more preferably about 3% to about 8% (by weight of the parfries) and most preferably from about 4% to about 6% of water or aqueous solution or dispersion is added to the parfry surface during the hydration step.

The hydrated par-fries of the present invention have a bulk moisture of about 35% to about 55% and a fat level of about 6% to about 25%. Preferably, the hydrated par-fried potato strips have from about 38% to about 52% bulk moisture, more preferably about 40% to about 50% moisture, and most preferably from about 42% to about 48% bulk moisture. Preferably, the par-fried potato strips have from about 8% to about 22% total fat, more preferably from about 10% to about 20% total fat and most preferably from about 12% to about 18% total fat.

Freezing

The final step in the process is subjecting the hydrated par-fried potato strips to a freezing process. Freezing the par-fried potato strips may be accomplished by methods known in the art including placing the strips in a blast of cold air, plate freezing, or by contacting the strips with a liquid refrigerant which is at a temperature below 0° F. (−17.8° C.), preferably below −20° F. (−28.9° C.). One may also use any of the fluorocarbons which exist in the liquid state. Particularly preferred is the use of liquid nitrogen.

The step of contacting the refrigerant with the par-fried potato strips may be accomplished by dipping the strips in a pool of the refrigerant, or by spraying the refrigerant on them. In any case, the time of contact is limited so that preferably only the surface layers of the strips become frozen. The time required to achieve the desired degree of freezing will vary depending on such factors as the temperature of the refrigerant, the size of the potato strips, etc. The freezing may either be a surface freeze or a total freeze. It is not essential that the surface freeze be accomplished by the use of a liquid refrigerant; one may use a refrigerant in a gaseous state. For example, the hydrated par-fried potato strips may be subjected to a current of cold air at a temperature below 0° F. (−17.8° C.). A convenient method is to use a conventional blast freezer or a high velocity current of air where the potato strips are subjected to a blast of cold air at a temperature of less than or equal to about −20° F. (−28.9° C.). Alternatively, the potato strips may be placed in a freezer compartment, for example, at −10° F. (−23.3° C.), of a suitable size such as a commercial or industrial unit. The frozen par-fried potato strips are then packed into tightly sealed, i.e. airtight, packages and stored at normal freezer temperatures of approximately 0° F. (−17.8° C.) to about −20° F. (−28.9° C.). The containers may contain a large amount of the potato strips, i.e. a few pounds, or may be designed to hold a suitable serving size.

Oven Finishing

When the frozen hydrated parfries are prepared for consumption, such as at a retail food outlet the par-fried potato strips are preferably cooked in an oven for from about 0.75 minutes to about 15 minutes, the oven being at a temperature from about 325° F. (162° C.) to about 800° F. (315° C.). A preferred time for such finish baking in a forced air convection or hot air impingement oven, with the hydrated parfries arranged principally in a single layer or contained within a rotating drum, is from about 1 minute to about 5 minutes at about 350° F. (176.7° C.) to about 500° F. (260° C.). The fries can alternatively be finished in a consumer's home oven. Since most home consumers do not own a deep-fat fryer, they will very much appreciate a good quality baked French fry. The time period and temperature for preparing the oven finished French fries will vary depending upon the quantity of strips, their initial temperature, the specific type of oven and the oven conditions (e.g., temperature, air velocity) used and the thermal properties of the hydrated parfries. Of particular importance are the thermal conductivity of the crust region, the thermal conductivity of the high-moisture interior region, and the surface heat transfer coefficient of the hydrated par fry. In general, higher thermal conductivities and higher surface heat transfer coeddicients will result in more rapid transfer of heat from the oven to the fry, resulting in reduced cooking time. Since it is an object of the present invention to provide a fast food process for quickly finishing frozen par-fries in an oven, these properties are of particular importance. The desirable thermal conductivities at oven temperature of the crust region in the hydrated par fry are from about 0.1 to 0.3 watts/m-° C. The desirable thermal conductivities at oven temperature of the high moisture core region in the hydrated par fry are from about 0.4 to 0.7 watts/m-° C. The thermal conductivity of the crust can be adjusted to the desirable range by controlling the level of moisture and fat in the crust.

The surface heat transfer coefficient of the hydrated par-fry is a function of forced air velocity, air temperature and the nature of the film at the surface of the fry. Higher surface heat transfer coefficients are desirable since this will generally lead to faster cooking time, and the formation of a more distinct and crisp low moisture crust region in the oven-finished French fry. The desirable surface heat transfer coefficients at oven temperature of the hydrated parfry in the oven are from about 50 to 400 watts/m$^2$-° C. The surface of the hydrated parfry may be modified to improve the absorption of radiant heat from the oven. A typical method of accomplishing this would be to alter the color, porosity and or reflectivity of the surface. Increasing the velocity of the oven air at the surface of the fry will also increase the surface heat transfer coefficient.

The oven finished French fries are golden brown in color and have a crisp crust and a moist interior. The finished French fries have a color, texture, mouthfeel and taste which closely resembles commercially prepared French fried potatoes that have been prepared by deep fat frying, such as M$^c$Donald's™.

Additional Ingredients

Flavoring agents, such as salt, pepper, butter, onion, or garlic may be added to the oil to enhance the flavor or modify the flavor to any desired taste. In addition, water soluble flavoring agents may be added to the water or aqueous solution or dispersion that is used to hydrate the surface of the parfry. Furthermore, oil-soluble flavoring agents or conditioned oil may be dispersed in water or aqueous solution to form an oil-in-water dispersion or emulsion that is used to hydrate the surface of the parfry. These are useful ways to enhance positive flavor and aroma in the oven-finished French fry. One skilled in the art will readily appreciate that the aforementioned listing of flavoring agents is in no way exhaustive, but is merely suggestive of the wide range of additives which are suitable for use in the practice of the present invention.

Other ingredients known in the art may also be added to the edible fats and oils used to fry the par-fried potato strips, including antioxidants such as TBHQ, chelating agents such as citric acid, and antifoaming agents such as dimethylpolysiloxane.

A primary advantage of the present invention is that it provides par-fried potato strips which yield oven-finished French fries of excellent texture.

Another advantage of the invention is that the French fry potato producer is now able to produce oven-finished French fries, having excellent texture. This is done simply by controlling the moisture migration as outlined in the steps above. It is most critical that the outer surface of the par-fries be hydrated to obtain the overall moisture content described herein. Often, in commercial restaurant operations the par-fried potato strips are finished by deep-frying to obtain a desirable texture. As a result of this invention, this step is completely unnecessary because the crisp crust and moist interior of the oven finished fries are virtually indistinguishable from French fries which have been finished using a deep frying process. Besides being advantageous from a texture standpoint, the invention also offers an economical advantage to the producer. It should be emphasized that the amount spent for cooking oil is one of the major expenditures incurred by the producer of French fries.

While specific preferred processing steps have been disclosed to facilitate an understanding of the invention, the functional equivalents can be substituted or additional ingredients may be added without departing from the spirit or essential characteristics of the present invention.

ANALYTICAL PROCEDURES

The methods for determining the bulk moisture and total fat of par-fried potato strips and hydrated par-fried potato strips are set forth below:

Determination of Bulk Moisture Content

Moisture content is determined by a forced air oven method as follows:

1. Uniformly grind up a representative sample of potato strips in a blender or conventional food processor.
2. Accurately weigh approximately 5 grams of ground sample (weight "A") into a previously tarred metal pan or dish.
3. Place the metal dish containing the sample in a forced air convection oven at 105° C. for 2 hours.
4. After 2 hours, remove the metal dish containing the dried sample and allow to cool to room temperature in a desiccator over a desiccant such as anhydrous calcium sulfate.
5. Re-weigh the dish containing the dried sample and calculate the weight of the dried sample (weight "B") by subtracting the dish tare weight.
6. Calculate the percent moisture of the sample as follows:

$$\% \text{ Moisture} = [(A-B)/(A)] \times 100$$

Determination of Total Fat Content

Total fat content is determined by a solvent extraction method as follows:

Apparatus

1. Soxtec HT6 extraction system, unit includes heating block and cooling condenser.
2. Recirculating water bath for cooling condenser.
3. Recirculating oil bath for heating block.
4. Extraction beakers.
5. Extraction thimbles, 26 mm (Fisher TC 1522-0018)
6. Nitrogen purging gas
7. Vacuum drying oven
8. Analytical balance (4 place)
9. Dispensing pipette (50 ml)

Materials

1. Methylene chloride (Baker 9315-33)
2. Boiling stones (Chemware PTFE Fisher 09-191-20)
3. Silicone oil (Fisher TC 1000-2779)
4. Glass wool (Fisher 11-390)

Procedure

1. Uniformly grind a representative sample of potato strips in a blender or conventional food processor.
2. Accurately weigh (to four places) a piece of glass wool (sufficient in size to contain sample pieces in the thimble) and the extraction thimble; record weight of thimble+glass wool (weight "A").
3. Load the ground sample into the thimble and cap the loaded thimble with the pre-weighed piece of glass wool.
4. Accurately weigh (to four places) and record the weight of the ground sample, thimble,+glass wool (weight "B").
5. Place two or more boiling stones into an extraction beaker and weigh (to four places); record weight of extraction beaker+boiling stones (weight "C").
6. Place loaded thimbles on the extraction unit and raise the thimbles to rinse position.
7. Pipette 50 ml of methylene chloride into each pre-weighed extraction beaker with boiling stones.
8. Set oil heating bath to 110° C. and water cooling bath to 28.3° C. and allow temperatures to equilibrate.
9. Lower the loaded thimbles into the extraction beaker containing the solvent and allow to boil in the solvent for 60 minutes with the condenser's pet cock in the open position.
10. Raise the thimbles to the rinsing position and rinse for 60 minutes.
11. Turn the condenser's pet cock to the closed position and allow the solvent to evaporate for 60 minutes. Turn the nitrogen purging gas on to aid the evaporation.

12. Transfer the beaker to a vacuum oven, pre-warmed to 120° C., for 30 minutes at full vacuum.
13. Allow the beaker to cool to room temperature and weigh (to four places), record the weight of the beaker+boiling stones+extracted fat (weight "D").
14. Calculate percent total fat as follows:

% Fat=[(D−C)/(B−A)]×100

Accordingly, the disclosed embodiments are considered in all respects to be illustrative and not restrictive. The scope of the invention is indicated by the appended claims.

EXAMPLE 1

Frozen commercial shoestring-cut par-fried potato strips are an acceptable starting product (e.g., Simplot Par-Fries; J. R. Simplot Co., Caldwell, Id.). A typical processing history may include: sorted and graded Russet Burbank potatoes are peeled, washed, trimmed and cut axially into shoestring strips (0.25 inch square cross-section). The potato strips are blanched in hot water or steam and partially dried with hot air such that the potato strips are reduced in weight by about 15%. The partially dried strips are then par-fried in partially-hydrogenated soybean oil (Iodine Value of about 67) for about 50 seconds at an oil temperature of about 375° F. (190.5° C.). The par-fried potato strips are then cooled and frozen in a blast freezer at −30° F. (−34.4° C.) and packaged. The par-fried potato strips have a moisture content of about 64% and a fat content of about 6%.

About 1 lb. of the packaged frozen par-fried potato strips are further processed by frying in a 45 lb. oil capacity foodservice frying kettle containing Primex 108 vegetable oil (blend of partially hydrogenated soybean oil and corn oil available from the Procter & Gamble Co.) for about 3 minutes at a temperature of about 335° F. (168.3° C.). The resulting par-fries are immediately frozen by immersion in liquid nitrogen for 20 seconds, and then equilibrated to about 0° F. (−17.8° C.). The par-fries have about 40% moisture and about 15% fat. The frozen par-fries are then hydrated by spraying a fine mist of water at ~70° F. (21.1° C.) onto the surface of the parfries. During the hydration process, the frozen par-fries are tumbled in order to achieve a uniform application of water onto the surface of the par-fries. Spraying of the water mist is continued until about 10% (by weight of the parfries) of water is applied to the surface of the par-fries. The frozen hydrated par-fries are then stored at either 0° F. (−17.8° C.) or 20° F. (−6.7° C.). The hydrated par-fries comprise about 46% bulk moisture and about 13% total fat.

The hydrated par-fries that were stored at 20° F. (−6.7° C.) were evaluated by Nuclear Magnetic Resonance (NMR) imaging, which provides a cross-sectional image representative of the moisture and fat distribution within the fry. The NMR image of the hydrated par-fry stored at 20° F. (−6.7° C.) reveals an intense high-moisture signal at the core of the par-fry (similar to that of a freshly prepared parfry) indicating that little if any moisture transfer occurs from the core to the crust during storage. In contrast, NMR images of par-fries prepared without the surface hydration step and stored at 20° F. show a significant reduction in the intensity of the moisture signal at the core of the par-fry, thereby indicating that moisture has migrated from the core to the crust region during storage.

About 128 grams of the frozen, hydrated par-fries that were stored at 0° F. (−17.8° C.) are prepared for consumption by baking in a forced air convection oven (Wells Manufacturing Co., Model No. M42003S). The hydrated par-fries are arranged in a single layer on an open wire mesh oven tray and baked for 1.5 minutes at an air temperature of about 425° F. (218.3° C.). A turbulent hot air flow exists within the oven chamber. The air velocity at the center of the oven chamber (immediately above the product bed) is about 900 feet per minute (274 meters per minute). The oven-finished French fries have a desirable crisp surface texture and a moist interior.

EXAMPLE 2

Frozen commercial shoestring-cut par-fried potato strips are an acceptable starting product (e.g., Simplot Par-Fries; J. R. Simplot Co., Caldwell, Id.). A typical processing history may include: sorted and graded Russet Burbank potatoes are peeled, washed, trimmed and cut axially into shoestring strips (0.25 inch square cross-section). The potato strips are blanched in hot water or steam and partially dried with hot air such that the potato strips are reduced in weight by about 15%. The partially dried strips are then par-fried in partially-hydrogenated soybean oil (Iodine Value of about 67) for about 50 seconds at an oil temperature of about 375° F. (190.5° C.). The par-fried potato strips are then cooled and frozen in a blast freezer at −30° F. (−34.4° C.) and packaged. The par-fried potato strips have a moisture content of about 64% and a fat content of about 6%.

About 1 lb. of the packaged frozen par-fried potato strips are further processed by frying in a 45 lb. oil capacity foodservice frying kettle containing Primex 108 vegetable oil (blend of partially hydrogenated soybean oil and corn oil available from the Procter & Gamble Co.) for about 5 minutes at a temperature of about 290° F. (143.3° C.). The resulting par-fries, which comprise about 36% moisture and about 20% fat, are immediately hydrated by spraying water at ~70° F. (21.1° C.) onto the surface of the parfries. About 6% (by weight of the par-fries) of water is applied to the surface of the par-fries. The hydrated par-fries are then frozen in a blast freezer at −30° F. (−34.4° C.) and packaged. The hydrated par-fries comprise about 40% bulk moisture and about 18% total fat. When baked in a forced air convection oven or a hot air impingement oven, the oven-finished French fries possess a desirable crisp surface and a moist interior.

What is claimed:

1. A process for preparing frozen par-fried potato strips consisting essentially of the steps of:

a) par-frying potato strips in oil at a temperature of from about 270° F. (132° C.) to about 385° F. (196° C.) for a time sufficient to reduce the moisture content of the par-fries to from about 30% to about 50%;

b) hydrating the surface of said par-fries by application of water or an aqueous solution or dispersion until the weight of said par-fries is increased by from about 1% to about 12%; and c) freezing said hydrated par-fries, wherein said frozen, hydrated par-fries have a bulk moisture of from about 35% to about 55%.

2. The process of claim 1 wherein the moisture content of the par-fried potato strips from step a) is from about 32% to about 46%.

3. The process of claim 2 wherein the moisture content of the par-fried potato strips from step a) is from about 34% to about 42%.

4. The process of claim 3 wherein the application of water or aqueous solution or dispersion increases the weight of said par-fries by from about 3% to about 8%.

5. The process of claim 4 wherein the application of water or aqueous solution or dispersion increases the weight of said par-fries by from about 4% to about 6%.

6. The process of claim 5 wherein the bulk moisture of said frozen, hydrated par-fries is from about 38% to about 52%.

7. The process of claim 6 wherein the bulk moisture of said frozen, hydrated par-fries is from about 40% to about 50%.

8. The process of claim 7 wherein the bulk moisture of said frozen, hydrated par-fries is from about 42% to about 48%.

9. The process of claim 2 wherein the application of water or aqueous solution or dispersion increases the weight of said par-fries by from about 3% to about 8%.

10. The process of claim 9 wherein the application of water or aqueous solution or dispersion increases the weight of said par-fries by from about 4% to about 6%.

11. The process of claim 10 wherein the bulk moisture of said frozen, hydrated par-fries is from about 38% to about 52%.

12. The process of claim 11 wherein the bulk moisture of said frozen, hydrated par-fries is from about 40% to about 50%.

13. The process of claim 12 wherein the bulk moisture of said frozen, hydrated par-fries is from about 42% to about 48%.

14. The process of claim 1 wherein the aqueous solution used for hydrating the surface of the par-fries comprises water and a water soluble flavoring agent.

15. The process of claim 1 wherein the aqueous dispersion used for hydrating the surface of the par-fries comprises an oil-soluble flavoring agent or conditioned oil dispersed within a continuous aqueous phase.

16. The process according to claim 1 wherein the water or aqueous solution or dispersion is applied to the surface of said par-fries by a spraying means.

17. The process of claim 1 wherein the par-fries from step a) are frozen prior to hydration of the surface.

* * * * *